J. C. Cameron,
Plow.

No. 113,625. Patented Apr. 11, 1871.

Witnesses:
P. C. Dieterich
Wm. C. L. Smith

Inventor:
J. C. Cameron
per Munn & Co.
Attorneys.

UNITED STATES PATENT OFFICE.

JOHN CHARLES CAMERON, OF MADISON STATION, MISSISSIPPI.

IMPROVEMENT IN COMBINED PLOWS AND SCRAPERS.

Specification forming part of Letters Patent No. 113,625, dated April 11, 1871.

*To all whom it may concern:*

Be it known that I, JOHN CHARLES CAMERON, of Madison Station, in the county of Madison and State of Mississippi, have invented a new and useful Improvement in Combined Plow and Scraper; and I do hereby declare that the following is a full, clear, and exact description thereof, which will enable others skilled in the art to make and use the same, reference being had to the accompanying drawing, forming part of this specification.

This invention relates to a new and useful improvement in an agricultural implement for cultivating growing crops, more especially designed for cotton, but applicable to other crops; and consists in a detachable scraper, which forms a continuation of the mold-board on the opposite side of the bar of the plow, projecting over the land-side, but attached to the plow in the place of the plow-point, as will be hereinafter more fully described.

Figure 1:
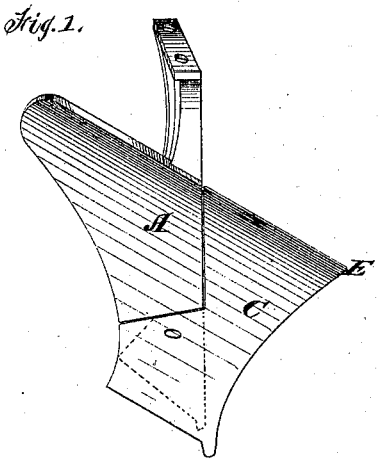
Figure 2:
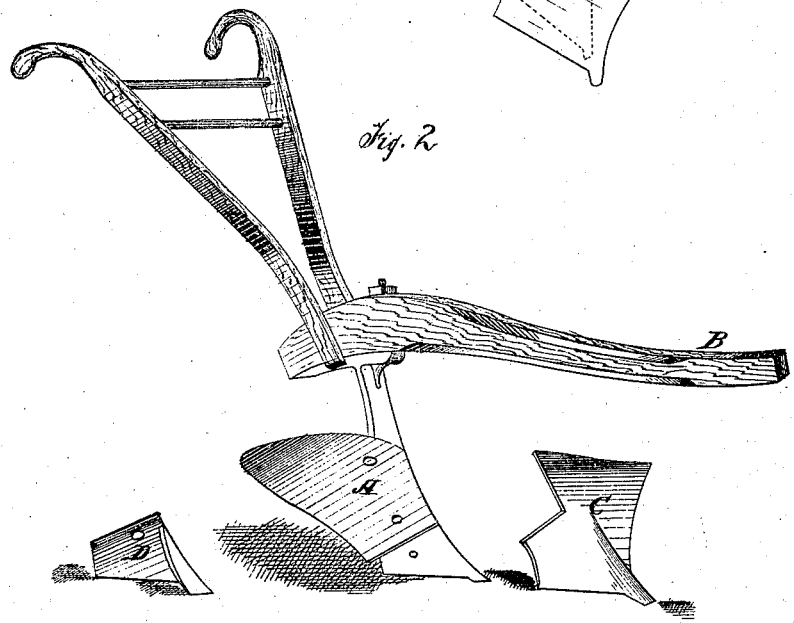

In the accompanying drawing, Figure 1 represents the scraper attached to the plow. Fig. 2 shows the plow with the point detached, but without the scraper, the latter being detached and separate, but ready to take the place of the point for fastening to the plow.

Similar letters of reference indicate corresponding parts.

A is the mold-board; B, the beam; C, the scraper or extension; D, the removable plow point or "share." The extension C is formed so as to occupy the space left vacant by the removal of the share, and is fastened to the plow by a bolt, one or more, the same as the share, or in any other substantial manner.

The scraper or extension projects over the land-side four or five inches, more or less, and retains the curvature that exists as it crosses the bar of the plow.

From the upper outer angle, E, the scraper or extension extends to the point F in nearly a straight line, forming a sharp cutting-edge, so that when at work the scraper will cut the ridge upon which the plant is growing at an angle of about forty-five degrees. The earth thus scraped off the ridge is carried to the center between the rows and turned under by the plow.

It is not to every growing crop or variety of cultivation that the scraper is adapted; but it is adapted to the growing cotton-plant, which is planted on ridges, and it may be used with advantage for most other growing plants which are susceptible of plow cultivation.

When not required the scraper is readily removed and laid aside, and the point is replaced, which leaves the plow ready for use in the ordinary manner.

Having thus described my invention, I claim as new and desire to secure by Letters Patent—

In combination with a plow, the scraper or extension C, constructed and applied substantially as and for the purposes herein shown and described.

JOHN CHARLES CAMERON.

Witnesses:
S. C. BROWN,
SAM. I. ZOU.